United States Patent
Tan et al.

(10) Patent No.: US 9,756,257 B2
(45) Date of Patent: Sep. 5, 2017

(54) CAMERA INCLUDED IN DISPLAY

(71) Applicant: Hewlett-Packard Development Company, L.P., Houston, TX (US)

(72) Inventors: Kar-Han Tan, Sunnyvale, CA (US); Paul W Martin, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/112,616

(22) PCT Filed: Jan. 31, 2014

(86) PCT No.: PCT/US2014/014316
§ 371 (c)(1),
(2) Date: Jul. 19, 2016

(87) PCT Pub. No.: WO2015/116217
PCT Pub. Date: Aug. 6, 2015

(65) Prior Publication Data
US 2016/0337570 A1    Nov. 17, 2016

(51) Int. Cl.
| | |
|---|---|
| *H04N 5/235* | (2006.01) |
| *G06F 3/14* | (2006.01) |
| *G06F 3/01* | (2006.01) |
| *G09G 5/00* | (2006.01) |
| *G06F 3/00* | (2006.01) |

(52) U.S. Cl.
CPC ............ *H04N 5/2354* (2013.01); *G06F 3/005* (2013.01); *G06F 3/01* (2013.01); *G06F 3/013* (2013.01); *G06F 3/14* (2013.01); *G09G 5/00* (2013.01); *H04N 5/2351* (2013.01); *G09G 2320/0686* (2013.01); *G09G 2320/08* (2013.01)

(58) Field of Classification Search
CPC .... H04N 5/2354; H04N 5/2351; G06F 3/013; G06F 3/005
See application file for complete search history.

(56) References Cited

U.S. PATENT DOCUMENTS

| | | | |
|---|---|---|---|
| 4,928,301 | A | 5/1990 | Smoot |
| 5,731,805 | A | 3/1998 | Tognazzini et al. |
| 8,199,185 | B2 | 6/2012 | McNelley et al. |
| 2007/0159449 | A1* | 7/2007 | Yoo ............... G09G 3/3406 345/102 |
| 2009/0102763 | A1 | 4/2009 | Border et al. |
| 2011/0063440 | A1 | 3/2011 | Neustaedter et al. |
| 2011/0117959 | A1* | 5/2011 | Rolston ............... A46B 7/04 455/556.1 |
| 2012/0274732 | A1 | 11/2012 | Tan et al. |
| 2013/0088630 | A1 | 4/2013 | Kanade et al. |

(Continued)

OTHER PUBLICATIONS

Solina, et al; "Fixing Missing Eye-contact in Video Conferencing Systems", <http://eprints.fri.uni-lj.si/ ~ Jun. 27-30, 2011 ~ 4 pages.

*Primary Examiner* — Abdelaaziz Tissire
(74) *Attorney, Agent, or Firm* — HP Inc. Patent Department

(57) ABSTRACT

A display has a capture mode. A camera is included in the display. A first region of the display including a field of view (FOV) of the camera may be dimmed during the capture mode. A second region of the display is outside the FOV. At least part of the second region is not dimmed during the capture mode.

12 Claims, 4 Drawing Sheets

(Camera Setting)

(Display Setting)

(56) References Cited

U.S. PATENT DOCUMENTS

| | | | |
|---|---|---|---|
| 2013/0293488 A1* | 11/2013 | Na | G06F 3/013 |
| | | | 345/173 |
| 2014/0009570 A1 | 1/2014 | Gorstan et al. | |
| 2014/0027503 A1 | 1/2014 | Kennedy et al. | |
| 2014/0043492 A1* | 2/2014 | Geiger | H04N 5/2256 |
| | | | 348/207.1 |

* cited by examiner

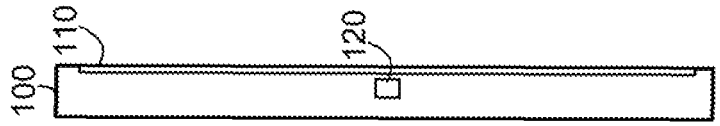
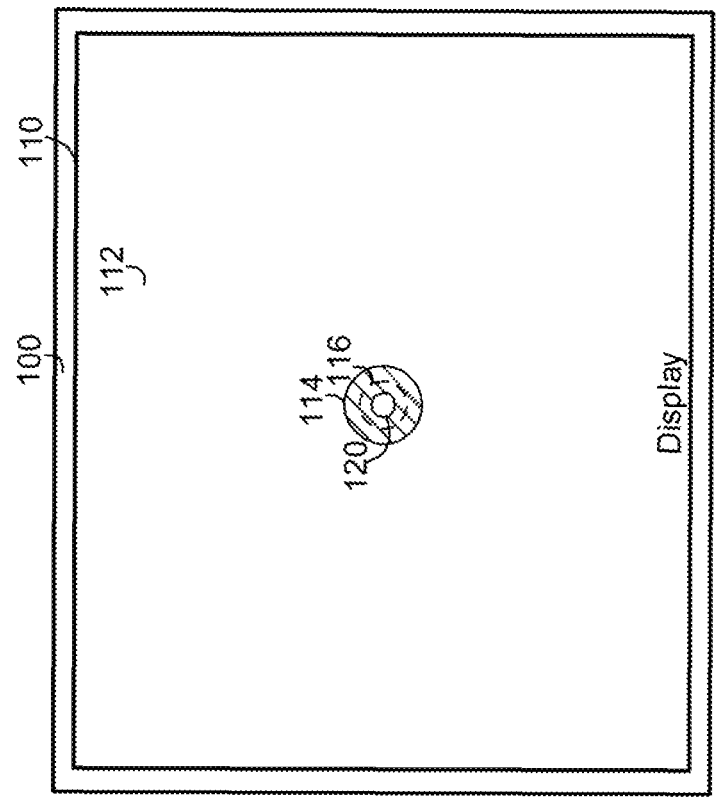

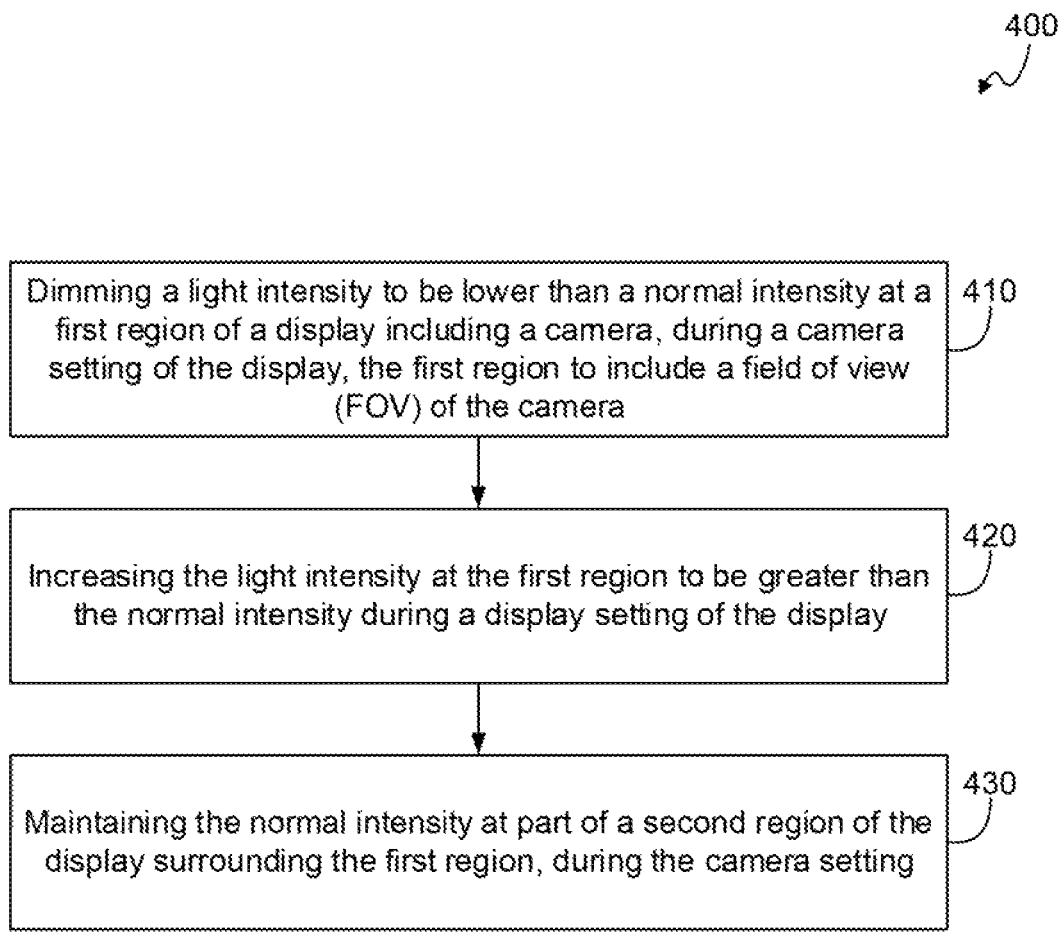

CAMERA INCLUDED IN DISPLAY

BACKGROUND

Users may use a camera in conjunction with a display for various purposes. For example, users may establish video links, which permit computers to act as videophones or videoconference stations. Other uses may include security surveillance, computer vision, video broadcasting, and recording social videos. Manufacturers, vendors, and/or service providers may be challenged to provide improved integration of cameras and displays.

BRIEF DESCRIPTION OF THE DRAWINGS

The following detailed description references the drawings, wherein:

FIGS. 1A and 1B are example block diagrams of a display including a camera;

FIG. 4 is an example flowchart of a method for dimming a light intensity of a display including a camera.

DETAILED DESCRIPTION

Figure 2A:
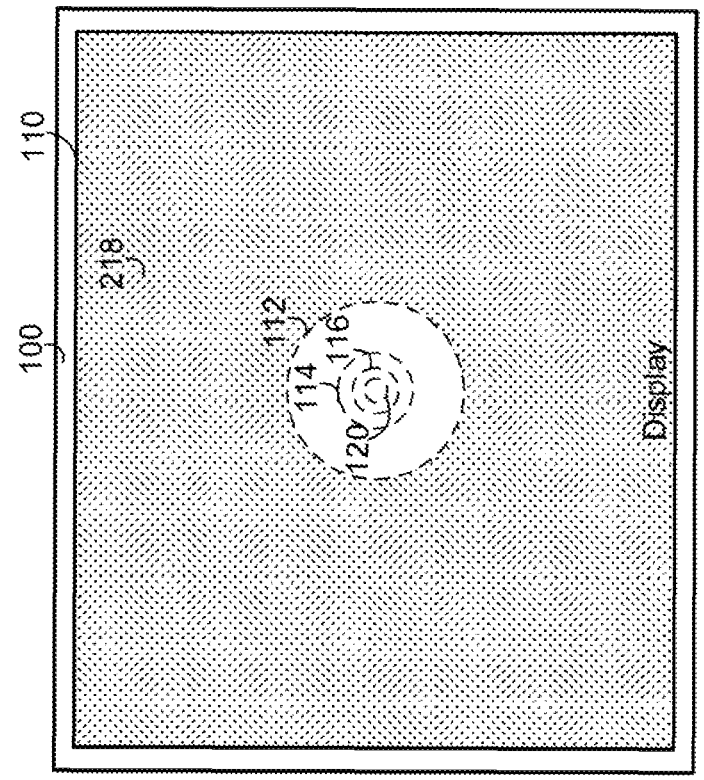
FIGS. 2A and 2B are example block diagrams of the first through third regions of the display of FIG. 1 during the camera and display settings.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Video collaboration may be limited by the lack of eye-contact between the participants of the video collaboration. Putting a camera behind a display may enable improved eye contact between participants in a remote collaboration application. This may be achieved by utilizing a transparent light emitting display. However, light from the display may also be observed in the camera, resulting in visual crosstalk which degrades the captured image.

Examples may utilize a time division approach, where a display is selectively dimmed in the camera's field-of-view (FOV) during the camera capture periods in order to reduce the crosstalk observed by the camera. In order to make the dimming less noticeable, regions surrounding the FOV region may have gradually decreasing amounts of dimming. An example device may include a display and a camera. The display has a capture mode. The camera is included in the display. A first region of the display including a field of view (FOV) of the camera may be dimmed during the capture mode. A second region of the display is outside the FOV. At least part of the second region may not be dimmed during the capture mode. Thus, examples may be able to capture images more clearly with a full range of wavelengths from the scene, resulting in higher quality images without unnatural lighting of the subject.

Referring now to the drawings, FIGS. 1A and 1B are example block diagrams of a display 100 including a camera 120. The display 100 may interface with or be included in any type of display device, such as a Cathode ray tube display (CRT), Light-emitting diode display (LED), Electroluminescent display (ELD), Electronic paper, E Ink, Plasma display panel (POP), Liquid crystal display (LCD), High-Performance Addressing display (HPA), Thin-film transistor display (TFT), Organic light-emitting diode display (OLED), Surface-conduction electron-emitter display (SED), Field Emission Display (FED), Laser TV, Carbon nanotubes, Quantum dot display, Interferometric modulator display (IMOD) and the like.

The term display device may refer to an output device for presentation of information in visual form, such as an electronic visual display, which may incorporate a flat panel display, performs as a video display and/or output device for presentation of images transmitted electronically, for visual reception, without producing a permanent record.

The term camera 120 may refer to an optical device that records images that can be stored directly, transmitted to another location, or both. These images may be still photographs or moving images such as videos or movies. Examples of the camera may be a still camera, a digital camera, a video camera, a webcam, an internet protocol (IP) camera. The camera may include an image sensor, such as a semiconductor charge-coupled devices (CCD) or active pixel sensors in complementary metal-oxide-semiconductor (CMOS) or N-type metal oxide-semiconductor (NMOS, Live MOS) technologies.

In FIG. 1, the display 100 is shown to include a camera 120. The display 100 and/or camera 120 may include and/or interface with, for example, a hardware device including electronic circuitry for implementing the functionality described below, such as control logic and/or memory. In addition or as an alternative, the display 100 and/or camera 120 may include and/or interface with a series of instructions encoded on a machine-readable storage medium and executable by a processor.

FIG. 1A illustrates a front-side view of the display 100 and FIG. 1B illustrates a cross-sectional side view of the display 100. The display 100 may have a capture mode. The camera 120 is included in the display. During the capture mode, the camera 120 may capture images (still or moving). If the display 100 is not in the capture mode, the camera 120 may not capture mages.

The capture mode may be triggered, for example, manually or automatically. For example, the user may turn on the capture video through an interface, such as a keyboard, mouse, touch sensitive display, and the like. Further, the capture mode may trigger automatically based on a type of an application being used, such as video conferencing software, or by tracking a position of a user's or user's features, such as head or eyes.

While the camera 120 is shown to be at center of the display 100, examples of the camera 120 may be placed along any point of a surface of the display 100, such as a corner of the display 100. Further, while a single camera 120 is shown in FIG. 1 examples may include a plurality of cameras 120 included in the display 100.

As shown in FIG. 1A, a first region 114 of the display 100 includes a field of view (FOV) 116 of the camera 120. The term FOV may refer to the part of the world that is visible through the camera 120 at a particular position and orientation in space. Objects outside the FOV when the image is captured are not recorded by the camera 120. The FOV may be expressed as the angular size of the view cone, or the angular extent of a given scene that is imaged by a camera.

The first region 114 may be dimmed during the capture mode. A second region 112 of the display 100 may be outside the FOV 116. At least part of the second region 112 may not be dimmed during the capture mode. Thus, at least part of the second 112 region may still be able to display information while the camera 120 captures images at the first region 114. An entirety of the display 100, including the first region 114, may display information continuously, if the display 100 is not in capture mode.

Hence a user may be able to use the display 100 as both a display device and an image capture device simultaneously, such as during videoconferencing, in the capture mode. As the camera 120 may be positioned at or near a point of interest on the surface 110 of the display 100, eye contact between video collaboration participants may be improved. As only the part of the display 100 within in the camera's 120 FOV is dimmed, the dimming is less noticeable. The first and second regions 114 and 112 will be explained in greater detail below with respect to FIGS. 2A and 2B.

While FIG. 1B shows the camera 120 to be behind, a surface 110 of the display 100, examples of the camera 120 may also be embedded into the surface 110 of the display 100. For example, the display 100 may be transparent, such as a transparent OLED if the camera 120 is behind the surface 110 of the display 100. Here, the display 100 may become transparent when dimmed thus allowing for the camera 120 to capture images without light interference.

In another example, pixels of the camera 120 may be alongside pixels of the display 100, if the camera 120 is embedded into the surface 110 of the display 100. Here, the display 100 need not be transparent as the camera pixels are not behind the display pixels. Nonetheless, the dimming of the display pixels may still reduce light interference, such as that caused by overexposure or unnatural lighting of the object to be captured.

Figure 2B:
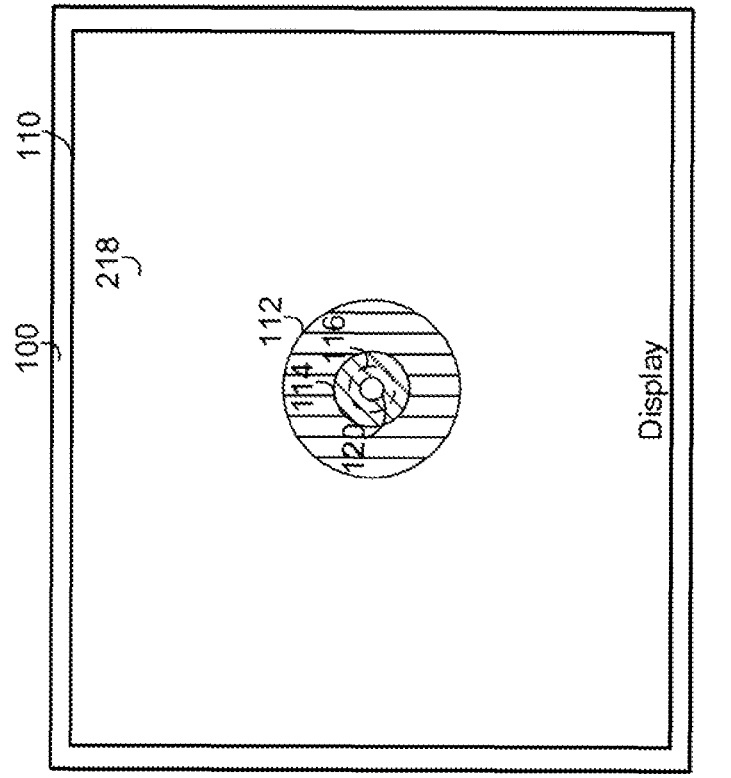

FIGS. 2A and 2B are example block diagrams of the first through third regions of the display 100 of FIG. 1 during the camera and display settings. The display 100 may alternate between a display setting and a camera setting during the capture mode. The display and camera settings may alternate according to a rate such that an image over the first region 114 may appear continuously visible to a user during the capture mode. The camera 120 may only capture an image during the camera setting.

In FIGS. 2A and 2B, the second region 112 has been reduced. In FIGS. 1A and 1B, the second region 112 covered a remainder of the surface 110 of the display 100. Here, the second region 112 is between the first region 114 and a third region 218. The third region 218 may not be dimmed during the capture mode. Thus, the third region 218 may maintain a normal or greater than normal light intensity during both the camera and display settings of the capture mode.

The second region 112 may be dimmed according to a non-uniform pattern during the capture mode, such as during the camera setting. The non-uniform pattern may include both dimmed and non-dimmed areas. For example, the pattern may be a combination of pixels that have less than normal intensity and normal or greater than normal intensity. In one instance, the pixels of the second region may have a random distribution for dimming. In another instance, the pixels of the second region 112 may be decreasingly dimmed as the pixels increase in distance from the first region 114. Thus, the second region 112 may have provide a transition from the first region 114, which has lower than normal intensity, to the third region 218, which has normal or greater than normal light intensity.

The term light intensity may also be interchangeably used with brightness or luminance. Light intensity may refer to a measurement of the amount of light the display 100 produces and may be measured in nits or candelas per square meter (cd/m2). The normal light intensity may, for example, range from 250 to 350 cd/m2 for a display. A lower light intensity may lower than that normal light intensity and a greater light intensity may be greater than the normal light intensity.

The normal light intensity of the display 100 may be based on external and/or internal factors. External factors may include properties of the display 100 and settings of the display 100. Properties of the display 100 may vary according to a type and model of the display, such as a type of the pixel. Settings of the display 100 may relate to default settings and/or user settings, such as brightness and contrast settings. The internal factors may be based on image data being output to the display 100, which may indicate, for example, a contrast, color, voltage and the like for the pixels of display 100.

As noted above, the first region 114 and at least part of the second region 112 may be dimmed during the camera setting. However, the first and second regions 114 and 112 may not be dimmed during the display setting. Further, in one example, the pixels of at least one of the first and second regions that are dimmed during the camera setting may be driven to output even more light than indicated by the image data during the display setting.

For example, an amount of increase of the light output by the pixels greater than that indicated by the image data during the display setting may be proportional to an amount the pixels are dimmed during the camera setting. Thus, examples may compensate for the dimness caused by the camera setting by increasing the light intensity during the display setting, such that the first region 114 and at least part of the second region 112 may not readily appear darker than the third region 218 to a user during the capture mode.

In one example, the display 100 may shift a point of interest on the display 100 to align with the FOV 116 of the camera 120 such that eyes of a user focus on the FOV 116 when viewing the point of interest. The point of interest may be any area of the display 100 that the user appears to be gazing at or that should be of interest to the user, such as another user's eyes in the case of video collaboration. For example, the point of interest may be cropped and/or moved to align with the FOV of the camera 120. Thus, the camera 120 may be used to track the user's eyes and/or position. Examples of the point of interest may include an image, a window, and the like.

In another example, motion parallax may be provided for images shown on the display 100. The display 100 may determine a line of sight between the user and the camera 120, with the line of site based on the positions of the user and the camera 120. For example, if the camera 120 is behind the display 110, the image may be shown on the display 100 where the line of site between the user and camera 120 intersects with a plane or surface 110 of the display 100. Here, the line of sight may shift based on a change in any of the three dimensions (e.g. depth, horizontal position, and vertical position) between the camera 120 and the user.

By utilizing a time division sequencing between the display and the camera, where the display, such as a'transparent OLEO, is spatially, selectively dimmed during the camera capture periods, examples may reduce crosstalk observed by the camera. To compensate for brightness loss due to the dimming, the display pixels that are dimmed may be driven to output more light outside of the capture periods.

Figure 3:
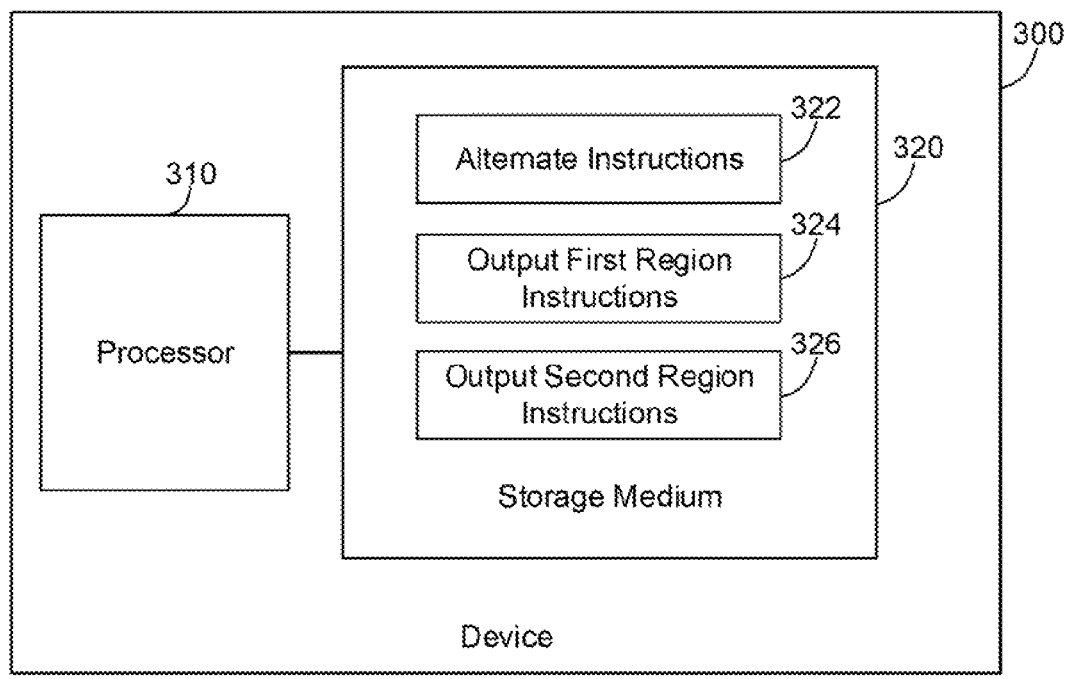
FIG. 3 is an example block diagram of a computing device including instructions for outputting light at a lower intensity for a display including a camera.

FIG. 3 is an example block diagram of a computing device 300 including instructions for outputting light at a lower intensity for a display including a camera. In the embodiment of FIG. 3, the computing device 300 includes a processor 310 and a machine-readable storage medium 320. The machine-readable storage medium 320 further includes instructions 322, 324 and 326 for outputting light at a lower intensity for a display including a camera.

The computing device 300 may be included in or part of, for example, a microprocessor a display, a controller, a notebook computer, a desktop computer, an all-in-one system, a server, a network device, a wireless device, or any other type of device capable of executing the instructions 322, 324 and 326. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 322, 324 and 326 to implement outputting light at the lower intensity for the display including the camera. As an alternative or in addition to retrieving and executing instructions, the processor 310 may include at least one integrated circuit (IC), other control logic, other electronic circuits, or combinations thereof that include a number of electronic components for performing the functionality of instructions 322, 324 and 326.

The machine-readable storage medium 320 may be any electronic, magnetic, optical, or other physical storage device that contains or stores executable instructions. Thus, the machine-readable storage medium 320 may be, for example. Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for outputting light at the lower intensity for the display including the camera.

Moreover, the instructions 322, 324 and 326 when executed by a processor (e.g., via one processing element or multiple processing elements of the processor) can cause the processor to perform processes, such as, the process of FIG. 4. For example, the alternate instructions 322 may be executed by the processor 310 to alternate between display and camera settings of a display.

The output first region instructions 324 may be executed by the processor 310 to output light at a lower intensity at a first region of the display during the camera setting and output light at a greater intensity at the first region during the display setting. The first region may include a FOV of a camera, included in the display. The greater intensity is brighter than the lower intensity.

The output second region instructions 326 may be executed by the processor 310 to output light at both the lower and greater than the lower intensities at a second region surrounding the first region, during the camera setting. The processor 310 may further execute instructions (not shown) to output light at greater than the lower intensity at a third region surrounding the second region, during both the display and camera settings.

FIG. 4 is an example flowchart of a method 400 for dimming a light intensity of a display including a camera. Although execution of the method 400 is described below with reference to the display 100, other suitable components for execution of the method 400 can be utilized. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on machine-readable storage medium, such as storage medium 320, and/or in the form of electronic circuitry.

At block 410, the display 100 may dim a light intensity to be lower than a normal intensity at a first region 114 of a display 100 including a camera 120, during a camera setting of the display 100. The first region 114 may include a FOV 116 of the camera. At block 420, the display 100 may increase the light intensity at the first region to be greater than the normal intensity during a display setting of the display. At block 430, the display 100 may maintain the normal intensity at part of a second region 218 of the display 100 surrounding the first region 114, during the camera, setting.

Further, the second region 218 may have a non-uniform light intensity including a range of light intensities from the lower than normal intensity to at least the normal intensity during the camera setting. The camera 120 may capture images during the camera setting and not capture images during the display setting. The display 100 may alternate between the camera and display settings according to a time-division sequence.

We claim:

1. A device, comprising:
   a display to have a capture mode; and
   camera included in the display, wherein
   a first region of the display including a field of view (FOV) of the camera is dimmed during the capture mode; and
   a second region of the display is outside the FOV, at least part of the second region is not dimmed during the capture mode; and wherein the display alternates between a display setting and a camera setting during the capture mode, the first and second regions are not dimmed during the display setting, and the first region is dimmed during the camera setting.

2. The device of claim 1, wherein, the second region is between a third region and the first region, and the third region is not dimmed during the capture mode.

3. The device of claim 2, wherein the second region includes both dimmed and non-dimmed areas.

4. The device of claim 1, wherein the display and camera settings are to alternate according to a rate such that an image over the first region appears continuously visible to a user.

5. The device of claim 1, wherein pixels of at least one of the first and second regions that are dimmed during the camera setting are driven to output more light than indicated by image data during the display setting.

6. The device of claim 5, wherein an amount of increase of the light output by the pixels greater than that indicated by the image data during the display setting is proportional to an amount the pixels are dimmed during the camera setting.

7. The device of claim 1, wherein point of interest is shifted to align with the FOV of the camera such that eyes of a user focus on the FOV when viewing the point of interest.

8. The device of claim 1, wherein, a line of sight is based on positions of a user and the camera, and an image on the display is shifted based on an intersection between a surface of the display and the line of sight.

9. The device of claim 1, wherein, the camera is at least one of behind a surface of the display and embedded into the surface of the display, the display is transparent if the camera is behind the surface of display, and pixels of the camera are alongside pixels of the display if the camera is embedded into the surface of the display.

10. The device of claim 9, wherein, the display includes at least one of a transparent organic light-emitting diode (OLED) display and field emission display (FED).

11. A method, comprising:
dimming a light intensity to be lower than a normal intensity at a first region of a display including a camera, during a camera setting, of the display, the first region to include a field of view (FOV) of the camera;
increasing the light intensity at the first region to be greater than the normal intensity during a display setting of the display; and
maintaining the normal intensity at part of a second region of the display surrounding the first region, during the camera setting, wherein the camera is to capture images during the camera setting and to not capture images during the display setting, wherein the second region is to have a non-uniform light intensity including a range of light intensities from the lower than normal intensity to at least the normal intensity during the camera setting, and wherein the display is to alternate between the camera and display settings according to a time-division sequence.

12. A non-transitory computer-readable storage medium storing instructions that, if executed by a processor of a device cause the processor to:
alternate between display and camera settings of a display;
output light at a lower intensity at a first region of the display during the camera setting and output light at a greater intensity at the first region during the display setting, the first region to include a field of view (FOV) of a camera included in the display;
output light at both the lower and greater than the lower intensities at a second region surrounding the first region, during the camera setting; and
output light at greater than the lower intensity at a third region surrounding the second region, during both the display and camera settings.

* * * * *

UNITED STATES PATENT AND TRADEMARK OFFICE
CERTIFICATE OF CORRECTION

| | | |
|---|---|---|
| PATENT NO. | : 9,756,257 B2 | Page 1 of 1 |
| APPLICATION NO. | : 15/112616 | |
| DATED | : September 5, 2017 | |
| INVENTOR(S) | : Kar-Han Tan et al. | |

It is certified that error appears in the above-identified patent and that said Letters Patent is hereby corrected as shown below:

In the Drawings

In sheet 3 of 4, reference numeral 322, Line 1, delete "Altemate" and insert -- Alternate --, therefor.

Signed and Sealed this
Twentieth Day of February, 2018

Andrei Iancu
*Director of the United States Patent and Trademark Office*